(12) United States Patent
Grave et al.

(10) Patent No.: US 10,300,429 B2
(45) Date of Patent: May 28, 2019

(54) SEPARATING IMPURITIES FROM A FLUID STREAM USING MULTIPLE CO-CURRENT CONTACTORS

(71) Applicants: Edward J. Grave, Montgomery, TX (US); Norman K. Yeh, Houston, TX (US); Stephanie A. Freeman, Houston, TX (US)

(72) Inventors: Edward J. Grave, Montgomery, TX (US); Norman K. Yeh, Houston, TX (US); Stephanie A. Freeman, Houston, TX (US)

(73) Assignee: ExxonMobil Upstream Research Company, Spring, TX (US)

( * ) Notice: Subject to any disclaimer, the term of this patent is extended or adjusted under 35 U.S.C. 154(b) by 289 days.

(21) Appl. No.: 14/948,422

(22) Filed: Nov. 23, 2015

(65) Prior Publication Data
US 2016/0199774 A1    Jul. 14, 2016

Related U.S. Application Data

(60) Provisional application No. 62/101,743, filed on Jan. 9, 2015.

(51) Int. Cl.
*B01D 53/14* (2006.01)
*B01D 53/18* (2006.01)
(Continued)

(52) U.S. Cl.
CPC ..... *B01D 53/1406* (2013.01); *B01D 53/1462* (2013.01); *B01D 53/1468* (2013.01);
(Continued)

(58) Field of Classification Search
CPC ..... B01D 53/14–53/1493; B01D 53/18; B01D 53/185; B01D 2252/2023;
(Continued)

(56) References Cited

U.S. PATENT DOCUMENTS

| | | | |
|---|---|---|---|
| 1,951,647 A | 3/1934 | Cooke | 196/46 |
| 2,847,200 A | 8/1958 | Ung | 202/158 |

(Continued)

FOREIGN PATENT DOCUMENTS

| | | | |
|---|---|---|---|
| CA | 2144585 | 6/1996 | B01D 53/52 |
| DE | 10162457 | 7/2003 | B01D 3/32 |

(Continued)

OTHER PUBLICATIONS

Carter, T. et al. (1998) "Addition of Static Mixers Increases Capacity in Central Texas Gas Plant," *Porceedings of the 77th GPA Ann. Conv.*, pp. 110-113.

(Continued)

*Primary Examiner* — Cabrena Holecek
(74) *Attorney, Agent, or Firm* — ExxonMobil Upstream Research Company—Law Department

(57) ABSTRACT

A method for decontaminating a contaminated fluid stream, comprising receiving the contaminated fluid stream, distributing the contaminated fluid stream substantially equally across a plurality of separation units sharing a unitary pressure boundary, receiving a solvent stream, and co-currently contacting the contaminated fluid stream with the solvent stream in the plurality of separation units.

10 Claims, 7 Drawing Sheets

(51) Int. Cl.
*C10L 3/10* (2006.01)
*B01D 53/26* (2006.01)

(52) U.S. Cl.
CPC ..... *B01D 53/1475* (2013.01); *B01D 53/1481* (2013.01); *B01D 53/18* (2013.01); *B01D 53/263* (2013.01); *C10L 3/102* (2013.01); *C10L 3/103* (2013.01); *C10L 3/104* (2013.01); *C10L 3/106* (2013.01); *B01D 2252/204* (2013.01); *B01D 2252/2023* (2013.01); *B01D 2257/306* (2013.01); *B01D 2257/308* (2013.01); *C10L 2290/08* (2013.01); *C10L 2290/542* (2013.01)

(58) Field of Classification Search
CPC ........ B01D 2252/204; B01D 2257/306; B01D 2257/308; C10L 2290/08; C10L 2290/542; C10L 3/10; C10L 3/102; C10L 3/106
See application file for complete search history.

(56) References Cited

U.S. PATENT DOCUMENTS

| | | | |
|---|---|---|---|
| 3,767,766 A | 10/1973 | Tjoa et al. | 423/220 |
| 3,773,472 A | 11/1973 | Hausberg et al. | 23/283 |
| 3,989,811 A | 11/1976 | Hill | 423/573 |
| 4,073,832 A | 2/1978 | McGann | 261/118 |
| 4,204,934 A | 5/1980 | Warren et al. | 204/186 |
| 4,318,717 A | 3/1982 | Sohier | 55/71 |
| 4,369,167 A | 1/1983 | Weir, Jr. | 423/210 |
| 4,405,580 A | 9/1983 | Stogryn et al. | 423/226 |
| 4,421,725 A | 12/1983 | Dezael et al. | 423/228 |
| 4,589,896 A | 5/1986 | Chen et al. | 62/28 |
| 4,603,035 A | 7/1986 | Connell et al. | 423/226 |
| 4,678,648 A | 7/1987 | Wynn | 423/226 |
| 4,701,188 A | 10/1987 | Mims | 55/20 |
| 4,752,307 A | 6/1988 | Asmus et al. | 55/73 |
| 4,824,645 A | 4/1989 | Jones et al. | 423/226 |
| 4,885,079 A | 12/1989 | Eppig et al. | 208/13 |
| 5,067,971 A | 11/1991 | Bikson et al. | 55/16 |
| 5,085,839 A | 2/1992 | Scott et al. | 423/210 |
| 5,091,119 A | 2/1992 | Biddulph et al. | 261/114.3 |
| 5,093,094 A | 3/1992 | Van Kleek et al. | 423/224 |
| 5,186,836 A | 2/1993 | Gauthier et al. | 210/512.1 |
| 5,209,821 A | 5/1993 | Shaw et al. | 159/4.01 |
| 5,439,509 A | 8/1995 | Spink et al. | 95/166 |
| 5,462,584 A | 10/1995 | Gavlin et al. | 95/231 |
| 5,603,908 A | 2/1997 | Yoshida et al. | 423/220 |
| 5,648,053 A | 7/1997 | Mimura et al. | 423/210 |
| 5,664,426 A | 9/1997 | Lu | 62/93 |
| 5,713,985 A | 2/1998 | Hamilton | 95/90 |
| 5,735,936 A | 4/1998 | Minkkinen et al. | 95/49 |
| 5,810,897 A | 9/1998 | Konosu | 55/418 |
| 5,837,105 A | 11/1998 | Stober et al. | 203/40 |
| 5,907,924 A | 6/1999 | Collin et al. | 45/194 |
| 5,988,283 A | 11/1999 | Gann | 166/357 |
| 6,063,163 A | 5/2000 | Dingman et al. | 423/229 |
| 6,071,484 A | 6/2000 | Dingman et al. | 423/229 |
| 6,089,317 A | 7/2000 | Shaw | 166/265 |
| 6,214,097 B1 | 4/2001 | Laslo | 96/236 |
| 6,228,145 B1 | 5/2001 | Falk-Pedersen et al. | 95/44 |
| 6,284,023 B1 | 9/2001 | Torkildsen et al. | 95/216 |
| 6,830,608 B1 * | 12/2004 | Peters | B01D 3/28 261/112.1 |
| 6,881,389 B2 | 4/2005 | Paulsen et al. | 423/210 |
| 7,018,451 B1 | 3/2006 | Torkildsen et al. | 95/216 |
| 7,128,276 B2 | 10/2006 | Nilsen et al. | 236/124 |
| 7,144,568 B2 | 12/2006 | Ricard et al. | 423/659 |
| 7,152,431 B2 | 12/2006 | Amin et al. | 62/637 |
| 7,175,820 B2 | 2/2007 | Minkkinen et al. | 423/228 |
| RE39,826 E | 9/2007 | Lu | 62/632 |
| 7,273,513 B2 | 9/2007 | Linga et al. | 95/235 |
| 7,560,088 B2 | 7/2009 | Keller et al. | 423/537.1 |
| 7,811,343 B2 | 10/2010 | Toma | 55/318 |
| 8,071,046 B2 | 12/2011 | Hassan et al. | 422/225 |
| 8,137,444 B2 | 3/2012 | Farsad et al. | 96/235 |
| 8,240,640 B2 | 8/2012 | Nakayama | 261/109 |
| 8,268,049 B2 | 9/2012 | Davydov | 95/199 |
| 8,336,863 B2 | 12/2012 | Neumann et al. | 261/115 |
| 8,343,360 B2 | 1/2013 | Schook | 210/788 |
| 8,454,727 B2 | 6/2013 | Dunne et al. | 95/51 |
| 8,475,555 B2 | 7/2013 | Betting et al. | 55/416 |
| 8,652,237 B2 | 2/2014 | Heldebrant et al. | 95/235 |
| 8,741,127 B2 | 6/2014 | Koseoglu et al. | 20/57 |
| 8,900,347 B2 | 12/2014 | Boulet et al. | 95/114 |
| 9,192,896 B2 | 11/2015 | Hassan et al. | B01F 7/00766 |
| 9,238,193 B2 | 1/2016 | Ji et al. | B01D 53/1468 |
| 9,353,315 B2 | 5/2016 | Heath et al. | C10G 5/06 |
| 9,599,070 B2 | 3/2017 | Huntington et al. | 60/39 |
| 9,764,252 B2 | 9/2017 | Whitney et al. | B01D 17/0217 |
| 9,902,914 B2 | 2/2018 | Mak | C10L 3/104 |
| 2001/0037876 A1 | 11/2001 | Oost et al. | 165/133 |
| 2003/0005823 A1 | 1/2003 | Leblanc R et al. | 95/149 |
| 2003/0155438 A1 | 8/2003 | Boee et al. | 239/533.2 |
| 2004/0092774 A1 | 5/2004 | Mimura et al. | 564/497 |
| 2005/0006086 A1 | 1/2005 | Gramme | 166/105.5 |
| 2006/0123993 A1 | 6/2006 | Henriksen | 96/234 |
| 2006/0185320 A1 | 8/2006 | Dureiko | 52/749 |
| 2007/0205523 A1 | 9/2007 | Kojima | 261/79.2 |
| 2008/0006011 A1 | 1/2008 | Larnholm et al. | 55/421 |
| 2008/0107581 A1 | 5/2008 | Sparling et al. | 423/222 |
| 2008/0115532 A1 | 5/2008 | Jager | 62/620 |
| 2008/0190291 A1 | 8/2008 | Krehbiel et al. | 95/241 |
| 2008/0257788 A1 | 10/2008 | Leito | 209/44 |
| 2008/0290021 A1 | 11/2008 | Buijs et al. | 210/500.27 |
| 2009/0213687 A1 | 8/2009 | Linga et al. | 366/167.2 |
| 2009/0241778 A1 | 10/2009 | Lechnick et al. | 95/177 |
| 2010/0229725 A1 | 9/2010 | Farsad et al. | 96/74 |
| 2011/0036122 A1 | 2/2011 | Betting et al. | 62/636 |
| 2011/0168019 A1 | 7/2011 | Northrop et al. | 95/186 |
| 2011/0185633 A1 | 8/2011 | Betting et al. | 48/127.5 |
| 2011/0217218 A1 | 9/2011 | Gupta et al. | 423/228 |
| 2011/0296869 A1 | 12/2011 | Buhrman et al. | 62/617 |
| 2012/0060691 A1 | 3/2012 | Bieri et al. | 95/270 |
| 2012/0204599 A1 | 8/2012 | Northrop et al. | 62/617 |
| 2012/0238793 A1 | 9/2012 | Cullinane et al. | 585/833 |
| 2012/0240617 A1 | 9/2012 | Weiss et al. | 62/611 |
| 2012/0279728 A1 | 11/2012 | Northrop et al. | 166/401 |
| 2013/0017144 A1 | 1/2013 | Menzel | 423/542 |
| 2014/0033921 A1 | 2/2014 | Peck et al. | 95/269 |
| 2014/0123851 A1 | 5/2014 | Jamtvedt et al. | 95/149 |
| 2014/0245889 A1 | 9/2014 | Hamre et al. | 95/223 |
| 2014/0331862 A1 | 11/2014 | Cullinane et al. | 95/186 |
| 2014/0335002 A1 | 11/2014 | Northrop et al. | 423/228 |
| 2014/0366446 A1 | 12/2014 | Sharma et al. | 48/127.3 |
| 2014/0373714 A1 | 12/2014 | Cloud et al. | 95/273 |
| 2015/0013539 A1 | 1/2015 | Eriksen et al. | 95/172 |
| 2015/0083425 A1 | 3/2015 | Sullivan et al. | |
| 2015/0135954 A1 | 5/2015 | Li et al. | |
| 2015/0191360 A1 | 7/2015 | Weiss et al. | C01B 31/20 |
| 2015/0267871 A1 | 9/2015 | Murray, Sr. et al. | F17D 3/01 |
| 2015/0322580 A1 | 11/2015 | Little | 205/554 |
| 2015/0352463 A1 | 12/2015 | Grave et al. | 95/219 |
| 2016/0060190 A1 | 3/2016 | Trucko et al. | C07C 7/005 |
| 2016/0136569 A1 | 5/2016 | Lee et al. | B01D 53/18 |
| 2016/0199774 A1 | 7/2016 | Grave et al. | 95/235 |
| 2016/0236140 A1 | 8/2016 | Northrop et al. | 95/210 |
| 2016/0263516 A1 | 9/2016 | Freeman et al. | 423/226 |
| 2016/0288045 A1 | 10/2016 | Kramer et al. | B01D 53/1493 |
| 2017/0145803 A1 | 5/2017 | Yeh et al. | E21B 43/36 |
| 2017/0157553 A1 | 6/2017 | Northrop et al. | 96/314 |
| 2017/0184021 A1 | 6/2017 | Huntington et al. | F02C 3/34 |
| 2017/0239612 A1 | 8/2017 | Mondkar et al. | 423/220 |
| 2018/0071674 A1 | 3/2018 | Freeman et al. | 423/228 |
| 2018/0361307 A1 | 12/2018 | Yeh et al. | B01D 53/1406 |
| 2018/0361309 A1 | 12/2018 | Yeh et al. | B01D 53/185 |
| 2018/0362858 A1 | 12/2018 | Ramkumar et al. | C10G 25/003 |

(56) References Cited

U.S. PATENT DOCUMENTS

FOREIGN PATENT DOCUMENTS

| EP | 0191985 | 8/1986 | ............ B01D 53/18 |
|---|---|---|---|
| EP | 0301623 | 1/1989 | ............ B01D 53/14 |
| EP | 1021237 | 3/1999 | ............ B01D 53/18 |
| EP | 1438484 | 4/2003 | ............ B01D 17/02 |
| EP | 1141520 | 5/2003 | ............ E21B 43/40 |
| EP | 1340536 | 9/2003 | ............ B01J 19/30 |
| EP | 2134446 | 9/2015 | ............ B01D 54/04 |
| GB | 1234862 | 6/1971 | ............ B01D 53/18 |
| GB | 1377026 | 12/1974 | ............ B01D 47/10 |
| GB | 1579249 | 11/1980 | ............... H01J 1/13 |
| GB | 2079177 | 7/1981 | ............ B01D 53/18 |
| GB | 2094951 | 9/1982 | ............... F22B 3/04 |
| GB | 2414688 | 12/2006 | ............ B01D 53/26 |
| JP | H48-066073 | 9/1973 | ............ B01D 47/10 |
| JP | 53-032109 | 3/1978 | ............... A61K 9/08 |
| JP | H06-170153 | 6/1994 | ............ B01D 53/34 |
| JP | 2014-000500 | 1/2014 | ............ B01D 53/14 |
| WO | WO1993/010883 | 6/1993 | ............ B01D 53/14 |
| WO | WO1997/046304 | 12/1997 | ............ B01D 53/26 |
| WO | WO1999/013966 | 3/1999 | ............ B01D 53/18 |
| WO | WO2000/056844 | 9/2000 | ............ C10L 3/10 |
| WO | WO2002/032536 | 4/2002 | ............ B01D 17/00 |
| WO | WO2003/072226 | 9/2003 | ............ B01D 53/14 |
| WO | WO2004/070297 | 8/2004 | ............... F25J 3/06 |
| WO | WO2009/140993 | 11/2009 | ............ B01D 45/16 |
| WO | WO2013/136310 | 9/2013 | ............ B01D 53/14 |
| WO | WO2014/042529 | 3/2014 | |
| WO | WO2014/094794 | 6/2014 | ............ B01D 17/04 |
| WO | WO2014/106770 | 7/2014 | |
| WO | WO2015/013539 | 1/2015 | ............ H04W 52/36 |
| WO | WO2015/105438 | 7/2015 | ............ B01D 53/14 |
| WO | WO2015/167404 | 11/2015 | ............ B01D 53/22 |
| WO | WO2016/064825 | 4/2016 | ............ B01D 53/48 |

OTHER PUBLICATIONS

Linga, H. et al. (2001) "New Selective H$_2$S Removal Process for the Refining Industry," *Nat'l Petrochemical & Refiners Assoc.*, AM-01-35, 9 pgs.

Linga, H. et al. (2006) "Potentials and Applications for the Pro-Pure Co-Current Contactors," *13$^{th}$ Annual India Oil & Gas Rev. Symp.*, Mumbai, India, 23 pages.

Nilsen, F. et al. (2001) "Selective H$_2$S Removal in 50 Milliseconds," *Gas Processors Assoc. Europe Annual Conference*, 12 pages.

Nilsen, F. et al. (2002) "Novel Contacting Technology Selectively Removes H$_2$S," *Oil & Gas Journal*, 17 pages.

Nilsen, F. et al. (2002) "Selective H$_2$S Removal Applications Using Novel Contacting Technology," *Gas Processors Assoc.*, 13 pgs.

ProSep Techlologies, Inc. (2007) "Selective H2S-Removal With Amines (ProCAP)," *Product Brochure*, 32 pages.

ProSep Techlologies, Inc. (2014) "ProDry," *Product Brochure*, 1 page.

ProSep Techlologies, Inc. (2014) "ProScav," *Product Brochure*, 1 page.

Schutte & Koerting (2012) "Gas Scrubbers," *Product Brochure*, Bulletin 7-S, 14 pgs.

U.S. Appl. No. 62/548,171 dated Aug. 21, 2017.

U.S. Appl. No. 62/548,172, dated Aug. 21, 2017.

Dow Chemical Company (Mar. 3, 2015) "Product Safety Assessment," *Selexol Solvents Product Brochure*, 3 pages.

Garrison, J. et al. (2002) "Keyspan Energy Canada Rimbey Acid Gas Enrichment with FLEXSORB SE PLUS Technology," Proceedings 2002 Laurance Reid Gas Conditioning Conf., Norman, OK, 8 pgs.

Hanna, James M. (2009) "Qatargas Expansion Projects: Why Change the Gas Treating Concept from Sulfino-D?,"*OSGAT 2009 Proceedings 5$^{th}$Int'l Conf., Mar. 31-Apr. 1, Abu Dhabi, UAE*, 33 pgs.

Jones, S. G. et al. (2004) "Design, Cost & Operation of an Acid Gas Enrichment & Injection Facility," *Proceedings 2004 Laurance Reid Gas Conditioning Conf., Norman, OK*, 43 pgs.

Nova Molecular Technologies, Inc. (Jul. 17, 2008) "Product Brochure," FLEXSORB SE, 1 page.

Puukilainen, E. et al. (2007) "Superhydrophobic Polyolefin Surfaces: Controlled Micro- an Nanostructures," *Dept. Of Chemistry, Univ. ofJoensuu, Langmuir*, vol. 23, No. 13, pp. 7263-7268.

Royan, T. et al. (1992) "Acid Gas Enrichment using FLEXSORB," *Proceedings 1992 Laurance Reid Gas Conditioning Conf, Norman, OK, Mar. 2-4*, 17 pgs.

Smith, W. B. (2010) "Typical Amine and Glycol Treating Unit Compared to Gas Membrane Separation System for Wellhead CO$_2$Trimming," *Laurance Reid Gas Conditioning Conf, Norman, OK*, Feb. 21-24, 2010, pp. 417-436.

True, Warran R. (1994) "New Mobile Bay Complex Exploits Major Sour Gas Reserve," *Oil & Gas Journal*, vol. 92, No. 21, 4 pgs.

Weiland, R. H. (2008) "Acid Gas Enrichment—Maximizing Selectivity," *Proceedings 2008 Laurance Reid Gas Conditioning Conf., Clarita, OK*, 16 pgs.

\* cited by examiner

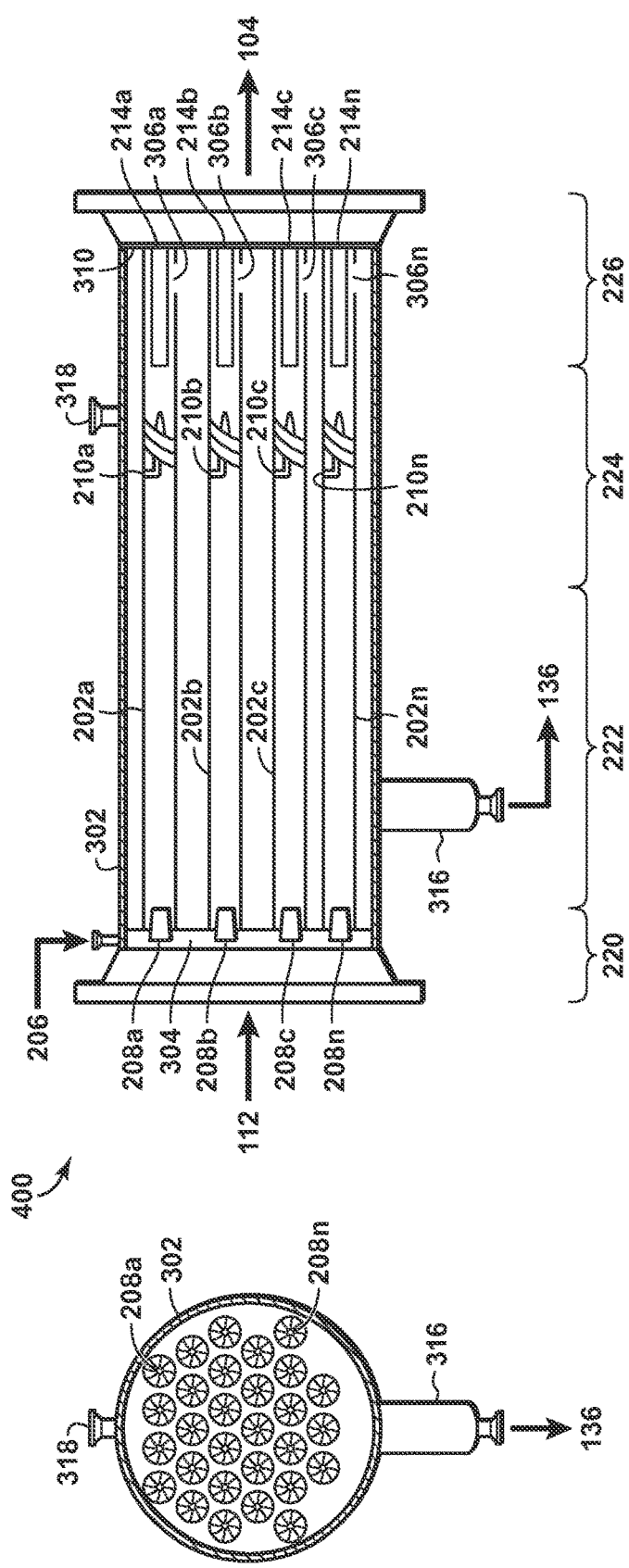

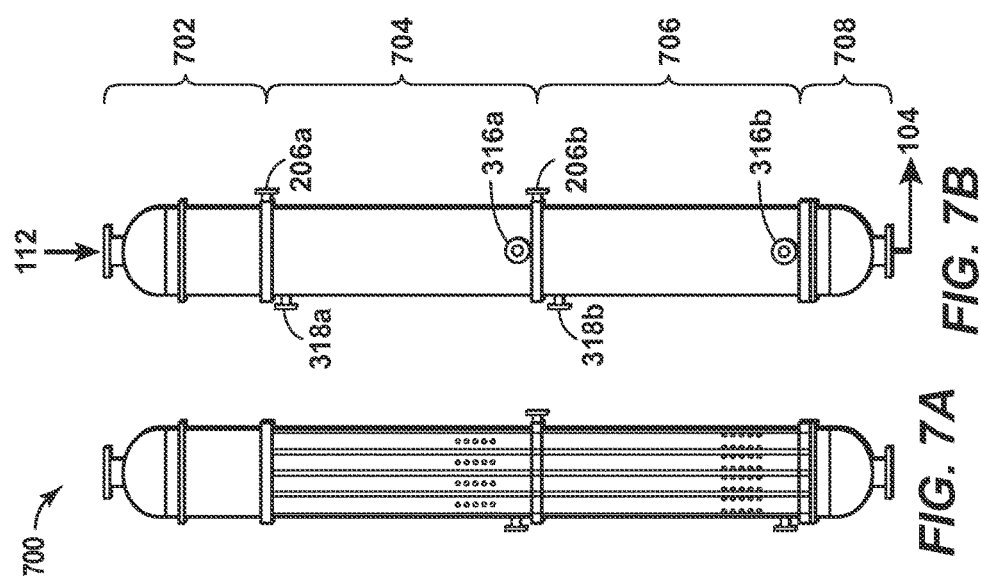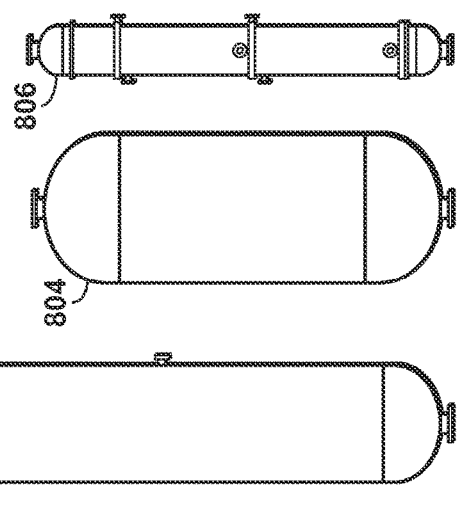

SEPARATING IMPURITIES FROM A FLUID STREAM USING MULTIPLE CO-CURRENT CONTACTORS

CROSS REFERENCE TO RELATED APPLICATIONS

This application claims the priority benefit of United States Provisional Patent Application 62/101,743 filed Jan. 9, 2015 entitled SEPARATING IMPURITIES FROM A FLUID STREAM USING MULTIPLE CO-CURRENT CONTACTORS, the entirety of which is incorporated by reference herein.

BACKGROUND

The production of hydrocarbons from a reservoir oftentimes carries with it the incidental production of non-hydrocarbon gases. Such gases include contaminants such as hydrogen sulfide ($H_2S$) and carbon dioxide ($CO_2$). When $H_2S$ or $CO_2$ are produced as part of a hydrocarbon stream (such as methane or ethane), the raw gas stream is sometimes referred to as "sour gas." The $H_2S$ and $CO_2$ are often referred to together as "acid gases."

In addition to hydrocarbon production streams, acid gases may be associated with synthesis gas streams, or with refinery gas streams. Acid gases may also be present within so-called flash-gas streams in gas processing facilities. Further, acid gases may be generated by the combustion of coal, natural gas, or other carbonaceous fuels.

Gas and/or hydrocarbon fluid streams may contain not only $H_2S$ or $CO_2$, but may also contain other "acidic" impurities. These include mercaptans and other trace sulfur compounds ($SO_x$). In addition, natural gas streams may contain water. Indeed, water is the most common contaminant in many natural gas streams. Such impurities should be removed prior to industrial or residential use.

Processes have been devised to remove contaminants from a raw natural gas stream. In the case of acid gases, cryogenic gas processing is sometimes used, particularly to remove $CO_2$ to prevent line freezing and plugged orifices. In other instances, particularly with $H_2S$ removal, the hydrocarbon fluid stream is treated with a solvent. Solvents may include chemical solvents such as amines Examples of amines used in sour gas treatment include monoethanol amine (MEA), diethanol amine (DEA), and methyl diethanol amine (MDEA).

Physical solvents are sometimes used in lieu of amine solvents. Examples include physical solvents currently marketed under the brand names Selexol® (comprising dimethyl ethers of polyethylene glycol) and Rectisol™ (comprising methanol). In some instances hybrid solvents, meaning mixtures of physical and chemical solvents, have been used. An example of one such hybrid solvent is currently marketed under the brand name Sulfinol® (comprising sulfolane, water, and one or more amines). However, the use of amine-based acid gas removal solvents is most common.

Amine-based solvents rely on a chemical reaction with the acid gases. The reaction process is sometimes referred to as "gas sweetening." Such chemical reactions are generally more effective than the physical-based solvents, particularly at feed gas pressures below about 300 pounds per square inch (psia) (2.07 megapascals (MPa)). There are instances where special chemical solvents such as Flexsorb® (comprising hindered amine) are used, particularly for selectively removing $H_2S$ from $CO_2$-containing gas and/or hydrocarbon fluid streams.

As a result of the gas sweetening process, a treated or "sweetened" gas stream is created. The sweetened gas stream is substantially depleted of $H_2S$ and/or $CO_2$ components. The sweetened gas can be further processed for liquids recovery, that is, by condensing out heavier hydrocarbon gases. The sweet gas may be sold into a pipeline or may be used for liquefied natural gas (LNG) feed. In addition, the sweetened gas stream may be used as feedstock for a gas-to-liquids process, and then ultimately used to make waxes, butanes, lubricants, glycols and other petroleum-based products. The extracted $CO_2$ may be sold, or it may be injected into a subterranean reservoir for enhanced oil recovery operations.

When a natural gas stream contains water, a dehydration process is usually undertaken before or after acid gas removal. This is done through the use of glycol or other desiccant in a water separator. The dehydration of natural gas is done to control the formation of gas hydrates and to prevent corrosion in distribution pipelines. The formation of gas hydrates and corrosion in pipelines can cause a decrease in flow volume as well as frozen control valves, plugged orifices and other operating problems.

Traditionally, the removal of acid gases or water using chemical solvents or desiccants involves counter-currently contacting the raw natural gas stream with the chemical. The raw gas stream is introduced into the bottom section of a contacting tower. At the same time, the solvent solution is directed into a top section of the tower. The tower has trays, packing, or other "internals." As the liquid solvent cascades through the internals, it absorbs the undesirable components, carrying them away through the bottom of the contacting tower as part of a "rich" solvent solution. At the same time, gaseous fluid that is largely depleted of the undesirable components exits at the top of the tower.

The rich solvent or rich glycol, as the case may be, that exits the contactor is sometimes referred to as an absorbent liquid. Following absorption, a process of regeneration (also called "desorption") may be employed to separate contaminants from the active solvent of the absorbent liquid. This produces a "lean" solvent or a "lean" glycol that is then typically recycled into the contacting tower for further absorption.

While perhaps capable of performing desired contacting for removal of contaminants from a gas and/or hydrocarbon-containing fluid stream, historic contactor solutions have had difficulty scaling-up from lab and/or pilot-sized units to units capable of efficiently processing up to a billion standard cubic feet per day (BSFD) of gas. Past scale-up solutions have high capital expenses (e.g., due to having larger and more pieces of equipment, etc.) and high operational expenses (e.g., due to less reliability and/or operability, larger size and weight equipment, etc.). Consequently, a need exists for a contacting solution that is smaller, has fewer pieces of equipment, has improved operability and reliability, and weighs less than traditional contacting equipment.

SUMMARY

One embodiment includes a method for decontaminating a contaminated fluid stream, comprising receiving the contaminated fluid stream, distributing the contaminated fluid stream substantially equally across a plurality of separation units sharing a unitary pressure boundary, receiving a solvent stream, and co-currently contacting the contaminated fluid stream with the solvent stream in the plurality of separation units.

Another embodiment includes an apparatus for decontaminating a contaminated fluid stream, comprising a vessel comprising a contaminated fluid stream inlet, a decontaminated fluid stream outlet, a solvent inlet, a contaminated solvent stream outlet, and a compact contacting bundle disposed within the vessel, wherein the compact contacting bundle comprises at least two substantially parallel separation units, and wherein each separation unit comprises a contacting section configured to contact the contaminated fluid stream and a solvent stream, a mass transfer section downstream of the contacting section, and a separation section downstream of the mass transfer section configured to separate a contaminated solvent stream from an at least partially decontaminated fluid stream.

Still another embodiment includes a system for decontaminating a contaminated fluid stream, comprising a pressure boundary vessel comprising an inlet section, a contactor section, and an outlet section, wherein the inlet section comprises a contaminated fluid stream inlet, a solvent inlet, and an inlet supply apparatus configured to place a solvent in communication with the contaminated fluid stream in at least two substantially parallel separation units, wherein the contactor section comprises the at least two substantially parallel separation units, each comprising a contacting section, a contaminated solvent orifice, and a decontaminated fluid outlet, a contaminated solvent collection plenum in communication with the contaminated solvent outlet orifices, a contaminated solvent outlet in communication with the contaminated solvent collection plenum, and a vent, wherein the outlet section comprises an outlet apparatus configured to pass a decontaminated fluid stream, and wherein the pressure boundary vessel is configured to withstand in excess of 150 pounds per square inch of pressure.

BRIEF DESCRIPTION OF THE DRAWINGS

The advantages of the present techniques are better understood by referring to the following detailed description and the attached drawings, in which:

FIG. 4A is a side view of an embodiment of a single stage multiple co-current contactor configuration.

FIG. 4B is a cross-sectional end view of an embodiment of the single stage multiple co-current contactor configuration of FIG. 4A.

FIG. 7A is a cross section view of a vertical embodiment of a two-stage multiple co-current contactor configuration.

FIG. 7B is a side view of the vertical embodiment of the two-stage multiple co-current contactor configuration of FIG. 7A.

FIG. 7C is an end view of the vertical embodiment of the two-stage multiple co-current contactor configuration of FIG. 7A.

FIG. 8 is a side-by-side comparison of a historic glycol tower having an inlet dehydration scrubber in comparison with an embodiment of a two-stage multiple co-current contactor.

DETAILED DESCRIPTION

Figure 1:
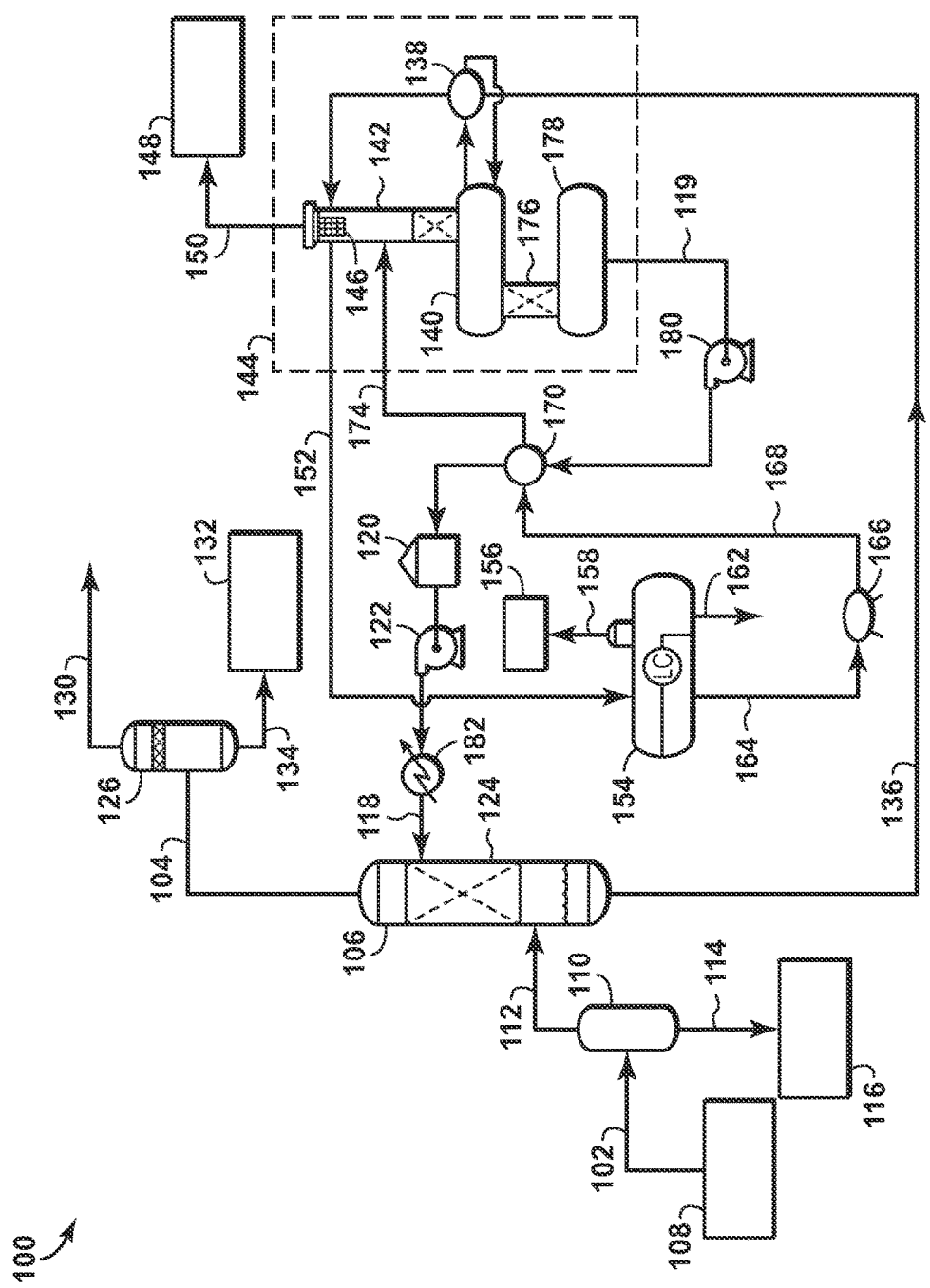
FIG. 1 is a schematic diagram of a chemical solvent-based gas processing facility.

In the following detailed description section, specific embodiments of the present techniques are described. However, to the extent that the following description is specific to a particular embodiment or a particular use of the present techniques, this is intended to be for exemplary purposes only and simply provides a description of the exemplary embodiments. Accordingly, the techniques are not limited to the specific embodiments described herein, but rather, include all alternatives, modifications, and equivalents falling within the true spirit and scope of the appended claims.

Disclosed herein are multiple contactors, contacting bundles, or contacting units configured in parallel within a single pressure vessel. In disclosed embodiments, an untreated, raw, or contaminated gas may enter a manifold that splits the gas into multiple contacting devices of suitable size and number to meet the desired capacity. Gas exiting the contacting bundle(s) can be recombined into a single line. Similarly, the inlet lean solvent may also be manifolded to feed each individual compact contacting unit. Some embodiments may collect rich solvent from each boot of the compact separation unit to a common header and may send the collected rich solvent back to a solvent regeneration system. Some embodiments may add a number of parallel separation units for increased throughput, and other embodiments may selectively shut-in branches or portions of separation units to increase turndown flexibility and/or for maintenance. The disclosure further includes multi-stage embodiments having multiple contacting bundle stages placed in-line. Such embodiments may include a counter-current flow of solvent. Additionally, the disclosed systems and methods may be utilized in horizontal and/or vertical arrangements depending on the desired operational characteristics or design requirements.

At the outset, for ease of reference, certain terms used in this application and their meanings as used in this context are set forth. To the extent a term used herein is not defined herein, it should be given the broadest definition persons in the pertinent art have given that term as reflected in at least one printed publication or issued patent. Further, the present techniques are not limited by the usage of the terms shown herein, as all equivalents, synonyms, new developments, and terms or techniques that serve the same or a similar purpose are considered to be within the scope of the present claims.

As used herein, the term "acid gas" refers to any gas that dissolves in water producing an acidic solution. Non-limiting examples of acid gases include hydrogen sulfide ($H_2S$), carbon dioxide ($CO_2$), sulfur dioxide ($SO_2$), carbon disulfide ($CS_2$), carbonyl sulfide (COS), mercaptans, or mixtures thereof.

As used herein, the term "co-current contacting device" or "co-current contactor" refers to a vessel that receives a fluid stream, e.g., a gas and/or liquid stream, and a separate stream of solvent in such a manner that the fluid stream and the solvent stream contact one another while flowing in generally the same direction within the contacting device. Non-limiting examples include an eductor and a coalescer, a spray nozzle in a pipe, or a static mixer in a pipe.

As used herein, the term "co-currently" refers to the internal arrangement of process streams within a unit operation that can be divided into several sub-sections by which the process streams flow in the same direction.

As used herein, the term "dehydrated gas feed stream" refers to a natural gas stream that has undergone a dehydration process. Typically the dehydrated gas feed stream has a water content of less than 50 parts per million (ppm), and preferably less than 7 ppm. Any suitable process for dehydrating the natural gas stream can be used. Typical examples of suitable dehydration processes include, but are not limited to, treatment of the natural gas stream with molecular sieves or dehydration using glycol or methanol. Alternatively, the natural gas stream can be dehydrated by formation of methane hydrates.

As used herein, the term "dehydration" refers to the treatment of a gas stream, e.g., a raw feed gas stream, to partially or completely remove water and, optionally, some heavy hydrocarbons. This can be accomplished by means of a pre-cooling cycle, against an external cooling loop or a cold internal process stream, for example. Water may also be removed by means of treatment with molecular sieves, e.g. zeolites, or silica gel or alumina oxide or other drying agents. Water may also be removed by means of washing with glycol, monoethylene glycol (MEG), diethylene glycol (DEG) or triethylene glycol (TEG), or glycerol. The amount of water in the dehydrated gas feed stream is suitably less than 1 percentage by volume (vol %), preferably less than 0.1 vol %, more preferably less than 0.01 vol %.

The term "enhanced oil recovery" (EOR) refers to processes for enhancing the recovery of hydrocarbons from subterranean reservoirs. Techniques for improving displacement efficiency or sweep efficiency may be used for the exploitation of an oil field by introducing displacing fluids or gas into injection wells to drive oil through the reservoir to producing wells.

As used herein, the term "fluid" refers to gases, liquids, and combinations of gases and liquids, as well as to combinations of gases and solids, and combinations of liquids and solids.

As used herein, the term "gas" is used interchangeably with "vapor," and refers to a substance or mixture of substances in the gaseous state as distinguished from the liquid or solid state. Likewise, the term "liquid" means a substance or mixture of substances in the liquid state as distinguished from the gas or solid state.

As used herein, the phrase "gas stream" is understood to mean a fluid stream comprising light hydrocarbons, e.g., methane, and/or heavy hydrocarbons, e.g., ethane, as received from any suitable type of hydrocarbon recovery operation, e.g., from a reservoir. The gas stream may be a raw natural gas stream including a non-absorbing gas, such as methane, and a contaminant, e.g., acid gas, dissolved or entrained in the raw natural gas stream. While a gas stream is discussed herein with respect to this disclosure, those of skill in the art will appreciate that generally the same principles may be applied to any fluid stream, including with respect to liquid-liquid contacting. Consequently, use of the phrases "gas stream," "gas inlet," "gas outlet," etc., are to be understood as non-limiting and may optionally be replaced with "fluid stream," "fluid inlet," "fluid outlet," and so forth in various embodiments within the scope of this disclosure. Use of the phrases "gas stream," "gas inlet," "gas outlet," etc. are for the sake of convenience only.

As used herein, the term "hydrocarbon" refers to an organic compound that primarily includes the elements hydrogen and carbon, although nitrogen, sulfur, oxygen, metals, or any number of other elements may be present in small amounts. As used herein, hydrocarbons generally refer to components found in natural gas, oil, or chemical processing facilities.

As used herein with respect to fluid processing equipment, the term "in series" means that two or more devices are placed along a flow line such that a fluid stream treated in a process moves from one item of equipment to the next while maintaining flow in a substantially constant downstream direction.

As used herein with respect to fluid processing equipment, the term "in-line" means that two or more components of a fluid mixing and separating device are connected sequentially with an identifiable common axis of orientation of flow or, more preferably, are integrated into a single tubular device with an identifiable common axis of orientation of flow.

As used herein, the term "industrial plant" refers to any plant that generates a gas stream containing at least one hydrocarbon or an acid gas. One non-limiting example is a coal-powered electrical generation plant. Another non-limiting example is a cement plant that emits $CO_2$ at low pressures.

As used herein, the term "liquefied natural gas" or "LNG" is natural gas generally known to include a high percentage of methane. However, LNG may also include trace amounts of other compounds. The other elements or compounds may include, but are not limited to, ethane, propane, butane, carbon dioxide, nitrogen, helium, hydrogen sulfide, or combinations thereof, that have been processed to remove one or more components (for instance, helium) or impurities (for instance, water and/or heavy hydrocarbons) and then condensed into a liquid at almost atmospheric pressure by cooling.

As used herein, the term "liquid solvent" refers to a fluid in substantially liquid phase that preferentially absorbs one component over another. A non-limiting example is that a liquid solvent may preferentially absorb an acid gas, thereby removing or "scrubbing" at least a portion of the acid gas component from a gas stream or a water stream.

As used herein, the term "liquid-vapor contacting device" refers to a device that provides for the contacting and development of at least one interfacial surface between liquid and vapor in the device. Examples of liquid-vapor contacting devices include plate column, packed column, wetted-wall (falling film) column, spray chamber, heat exchanger, or any combination thereof. Examples of devices including plate columns and packed columns include distillation columns, fractionation columns, and stripping columns.

As used herein, the term "natural gas" refers to a multi-component gas obtained from a crude oil well or from a subterranean gas-bearing formation. The composition and pressure of natural gas can vary significantly. A typical natural gas stream contains methane ($CH_4$) as a major component, i.e., greater than 50 mol % of the natural gas stream is methane. The natural gas stream can also contain ethane ($C_2H_6$), higher molecular weight hydrocarbons (e.g., $C_3$-$C_{20}$ hydrocarbons), one or more acid gases (e.g., carbon dioxide or hydrogen sulfide), or any combinations thereof. The natural gas can also contain minor amounts of contaminants such as water, nitrogen, iron sulfide, wax, crude oil, or any combinations thereof.

As used herein, the term "non-absorbing gas" means a gas that is not significantly absorbed by a solvent during a gas treating or conditioning process.

As used herein, the term "solvent" refers to a substance capable at least in part of dissolving or dispersing one or more other substances, such as to provide or form a solution. The solvent may be polar, nonpolar, neutral, protic, aprotic, or the like. The solvent may include any suitable element, molecule, or compound, such as methanol, ethanol, propanol, glycols, ethers, ketones, other alcohols, amines, salt solutions, or the like. The solvent may include physical solvents, chemical solvents, or the like. The solvent may operate by any suitable mechanism, such as physical absorption, chemical absorption, chemisorption, physisorption, adsorption, pressure swing adsorption, temperature swing adsorption, or the like.

As used herein, the term "sweetened gas stream" refers to a fluid stream in a substantially gaseous phase that has had at least a portion of acid gas components removed.

As used herein, the term "tubesheet" refers to a planar surface extending over substantially the entire cross-section of the vessel and comprising a plurality of holes to which the ends of the contacting units couple. The ends of the contacting units are attached to the tubesheet by any means known in the art, e.g., welding, rolling, etc., and the outer circumference of the tubesheet may be similarly attached to the vessel shell. The tubesheet may be otherwise modified or configured as described herein.

As used herein, the terms "a" and "an," mean one or more when applied to any feature in embodiments of the present inventions described in the specification and claims. The use of "a" and "an" does not limit the meaning to a single feature unless such a limit is specifically stated.

As used herein, the term "about" means±10% of the subsequent number, unless otherwise stated.

As used herein, the terms "approximate," "approximately," "substantial," and "substantially," mean a relative amount of a material or characteristic that is sufficient to provide the intended effect. The exact degree of deviation allowable in some cases may depend on the specific context, e.g., ±1%, ±5%, ±10%, ±15%, etc. . . . It should be understood by those of skill in the art who review this disclosure that these terms are intended to allow a description of certain features described and claimed without restricting the scope of these features to the precise numeric ranges provided. Accordingly, these terms should be interpreted as indicating that insubstantial or inconsequential modifications or alterations of the subject matter described and are considered to be within the scope of the disclosure.

As used herein, the definite article "the" preceding singular or plural nouns or noun phrases denotes a particular specified feature or particular specified features and may have a singular or plural connotation depending upon the context in which it is used.

FIG. 1 is a schematic diagram of a chemical solvent-based gas processing facility 100. The gas processing facility 100 may be used to remove water and/or other contaminants from a raw or contaminated natural gas stream 102, generating a dehydrated and/or decontaminated natural gas stream 104. This may be accomplished by flowing the raw natural gas stream 102 into a contactor 106, which may remove the water from the raw natural gas stream 102. The dehydrated natural gas stream 104 may then be flowed out of the contactor 106 as an overhead stream. In addition, residual water and acid gas components may be removed in connection with a subsequent process, as discussed further herein.

The raw natural gas stream 102 may be obtained from a subsurface reservoir 108 via any suitable type of hydrocarbon recovery operation. The raw natural gas stream 102 may include a non-absorbing gas, such as methane. In addition, the raw natural gas stream 102 may include an acid gas, e.g., $H_2S$, $CO_2$, etc. . . . . For example, the raw natural gas stream 102 may include about 1 to about 30% $H_2S$ or about 1 to about 40% $CO_2$, along with the hydrocarbon gas.

As shown in FIG. 1, the raw natural gas stream 102 may be flowed into an inlet separator 110 upon entry into the gas processing facility 100. When entering the inlet separator 110, the raw natural gas stream 102 may be under a large amount of pressure. However, the pressure of the raw natural gas stream 102 may vary considerably, depending on the characteristics of the subsurface reservoir 108 from which the gas product is produced. For example, the pressure of the raw natural gas stream 102 may range between atmospheric pressure and several thousand pounds per square inch gauge (psia). For natural gas treating applications, the pressure of the raw natural gas stream 102 may be boosted to about 100 psia (about 7 bar), about 500 psia (about 34 bar), about 1000 psia (about 70 bar), or greater, if desired.

The inlet separator 110 may clean the raw natural gas stream 102, for example, to prevent foaming of liquid solvent during a later acid gas treatment process. This may be accomplished by separating the raw natural gas stream into liquid-phase components and gas-phase components. The liquid-phase components may include heavy hydrocarbons, a small portion of water, and impurities such as brine and drilling fluids. Such components may be flowed out of the inlet separator 110 via a bottoms line 114, and may be sent to an oil recovery system 116. The gas-phase components may include natural gas and some amount of impurities, such as acid gases and water. Such components may be flowed out of the inlet separator 110 as the overhead natural gas stream 112.

From the inlet separator 110, the natural gas stream 112 may be flowed into the contactor 106. The contactor 106 may use a desiccant, such as a liquid glycol stream 118, to absorb water in the natural gas stream 112. The liquid glycol stream 118 may include various glycols, such as triethylene glycol, among others. The liquid glycol stream 118 may be stored in a glycol tank 120. A pump 122 may force the liquid glycol stream 118 from the glycol tank 120 into the contactor 106 under suitable pressure. For example, the pump 122 may boost the pressure of the liquid glycol stream 118 to about 1,000 psia (about 70 bar) or higher, depending on the pressure of the raw natural gas stream 102.

Once inside the contactor 106, gas within the natural gas stream 112 moves upward through the contactor 106. Typically, one or more trays 124 or other internals are provided within the contactor 106 to create indirect flow paths for the natural gas stream 112 and to create interfacial area between the gas and liquid phases. At the same time, the liquid from the liquid glycol stream 118 moves downward and across the succession of trays 124 or other internals in the contactor 106. The trays 124 or other internals aid in the interaction of the natural gas stream 112 with the liquid glycol stream 118.

The contactor 106 operates on the basis of a countercurrent flow scheme. In other words, the natural gas stream 112 is directed through the contactor 106 in one direction, while the liquid glycol stream 118 is directed through the contactor 106 in the opposite direction. As the two fluid materials interact, the down-flowing liquid glycol stream 118 absorbs water from the up-flowing natural gas stream 112 to produce the dehydrated natural gas stream 104.

Upon exiting the contactor 106, the dehydrated natural gas stream 104 can be flowed through an outlet separator 126. The outlet separator 126, also referred to as a scrubber, may allow any liquid glycol carried over from the contactor 106 to fall out of the dehydrated natural gas stream 104. The outlet separator 126 may also be used as a water wash vessel to capture vapor-phase solvent. A final dehydrated natural gas stream may be flowed out of the outlet separator 126 via an overhead line 130. Any residual liquid glycol 132 may drop out through a bottoms line 134.

A spent desiccant stream 136 flows from the bottom of the contactor 106. The spent desiccant stream 136 may be a glycol solution that is rich (e.g., enriched) in the absorbed water. The spent desiccant stream 136 may be at a relatively high temperature, such as about 90° Fahrenheit (F) (about 32° Celsius (C)) to about 102° F. (about 39° C.), or higher. In various embodiments, the gas processing facility 100 includes equipment for regenerating the liquid glycol stream 118 from the spent desiccant stream 136, as discussed further herein.

From the contactor 106, the spent desiccant stream 136 may be flowed through a heat exchanger 138. Within the heat exchanger 138, the spent desiccant stream 136 may be cooled, providing heat to a reboiler 140 that is coupled to a distillation column 142 within a regenerator 144. The regenerator 144 may be used to regenerate the liquid glycol stream 119 from the spent desiccant stream 136. The regenerator 144 may be a large pressure vessel, or interconnected series of pressure vessels, that operates at about 15 to about 25 psia, for example.

The spent desiccant stream 136 can be flowed through a tube bundle 146 in the top of the distillation column 142. High-temperature water vapor and off-gases 148 being released from the distillation column 142 may preheat the spent desiccant stream 136 as it flows through the tube bundle 146, before the water vapor and off-gases 148 are released via an overhead line 150.

After being preheated within the distillation column 142, the spent desiccant stream 136 may be released from the tube bundle 146 as a warmed glycol stream 152. The warmed glycol stream 152 may be flowed into a flash drum 154. The flash drum 154 may operate at a pressure of about 50 psia (about 3 bar) to about 100 psia (about 7 bar), for example. The flash drum 154 may have internal parts that create a mixing effect or a tortuous flow path for the glycol stream 152.

Residual gases 156, such as methane, $H_2S$, or $CO_2$, may be flashed out of the flash drum 154 via an overhead line 158. The residual gases 156 captured in the overhead line 158 may be reduced to an acid gas content of about 100 ppm if contacted with an amine. This concentration of acid gases is small enough that the residual gases 156 can be used as fuel gas for the gas processing system 100.

In addition, any entrained heavier hydrocarbons, such as ethane or propane, within the glycol stream 152 may be captured within the flash drum 154. The resulting hydrocarbon stream may be flowed out of the flash drum 154 via a bottoms line 162.

Further, as the temperature and pressure of the glycol stream 152 drops within the flash drum 154, the hydrocarbons within the glycol stream 152 are separated out, producing a partially-purified glycol stream 164. The partially-purified glycol stream 164 may then be released from the flash drum 154. The partially-purified glycol stream 164 may be flowed through a filter 166, such as a carbon filter, for particle filtration.

The resulting filtered glycol stream 168 may then be flowed through a heat exchanger 170. Within the heat exchanger 170, the filtered glycol stream 168 may be heated via heat exchange with the liquid glycol stream 119. The resulting high-temperature glycol stream 174 may be flowed into the distillation column 142 of the regenerator 144. As the filtered, high-temperature glycol stream 174 travels through the distillation column 142, water vapor and off-gases 148, such as $H_2S$ and $CO_2$, may be removed from the filtered high-temperature glycol stream 174.

The glycol stream 174 may be flowed out of the bottom of the distillation column 142 and into the reboiler 140. The reboiler 140 may increase the temperature of the glycol stream 174 using the heat generated by the heat exchanger 138. In addition, the reboiler 140 may boil off residual water vapor and off-gases 148 from the glycol stream 174. The components that are boiled off may travel upward through the distillation column 142 and become the water vapor and off-gases 148 in the overhead line 150.

The regenerator 144 may also include a separate stripping section 176 fed from the liquid pool in the reboiler 140. The stripping section 176 may include packing that promotes further distillation. Any remaining impurities, such as water, $H_2S$, or $CO_2$, boil off and join the water vapor and off-gases 148 in the overhead line 150. The glycol stream 174 may then be flowed into a surge tank 178, from which it may be released as the liquid glycol stream 119.

The regenerated liquid glycol stream 119 may be pumped out of the surge tank 178 via a pump 180. The pump 180 may increase the pressure of the liquid glycol stream 119 to about 1,500 psia (about 103 bar) or about 2,500 psia (about 172 bar), for example.

The liquid glycol stream 119 is then flowed through the heat exchanger 170. Heat exchanged with the filtered glycol stream 168 in the heat exchanger 170 may serve to partially cool the liquid glycol stream 119. In addition, the liquid glycol stream 119 may be flowed through a cooler 182 prior to being returned to the contactor 106. The cooler 182 may cool the liquid glycol stream 119 to ensure that the liquid glycol stream 118 is not flashing when it is returned to the contactor 106. For example, the cooler 182 may chill the liquid glycol stream 119 to about 100° F. (about 37° C.) to about 125° F. (about 52° C.).

FIG. 1 is not intended to indicate that the gas processing system 100 is to include all of the components shown in FIG. 1. Further, any number of additional components may be included within the gas processing system 100, depending on the details of the specific implementation. For example, the gas processing system 100 may include any suitable types of heaters, chillers, condensers, liquid pumps, gas compressors, blowers, bypass lines, other types of separation and/or fractionation equipment, valves, switches, controllers, and pressure-measuring devices, temperature-measuring devices, level-measuring devices, or flow-measuring devices, among others. Further, FIG. 1 demonstrates the use of a known contactor 106 in the context of a gas dehydration process. However, the gas processing facility 100 is also substantially representative of a sour gas removal operation. In that instance, the liquid glycol stream 118 includes a chemical solvent, such as a primary amine, a secondary amine, or a tertiary amine. The liquid glycol stream 118 may also be an ionic liquid or a blend of a physical solvent with an amine. For purposes of discussion, the liquid glycol stream 118 may be interchangeably referred to herein as an amine, a chemical solvent, or an absorbent liquid. In some embodiments, a solvent that preferentially removes $H_2S$ molecules over $CO_2$ molecules may be used. For example, a tertiary amine typically does not effectively strip out $CO_2$ as quickly as $H_2S$. Therefore, two separate gas processing systems 100 may be sequentially operated, with one configured to strip out primarily $H_2S$, and the other configured to strip out primarily $CO_2$. A separate $CO_2$ stream that is substantially free of $H_2S$ may also be generated. Those of skill in the art will appreciate that alternate embodiments may require some modification. For example, embodiments using amine may require modifying the regenerator 144 to include a stripping or desorption column and other equipment as necessary to effect rich amine regeneration.

In the gas processing system 100 of FIG. 1, the contactor 106 includes a single contacting tower. However, in some applications, more than one contacting tower may be used. In addition, very large contactors may be used for high-volume, high-pressure applications. In the case of low-pressure applications, such as $CO_2$ removal from flue gas at a power generation plant, a 50 foot by 50 foot duct contactor may be required for a relatively small, 500 megawatt power plant flue gas application. Many hundreds of gallons per minute of solvent would also be flowed through the contactor. Thus, such operations may become very costly.

Figure 2:
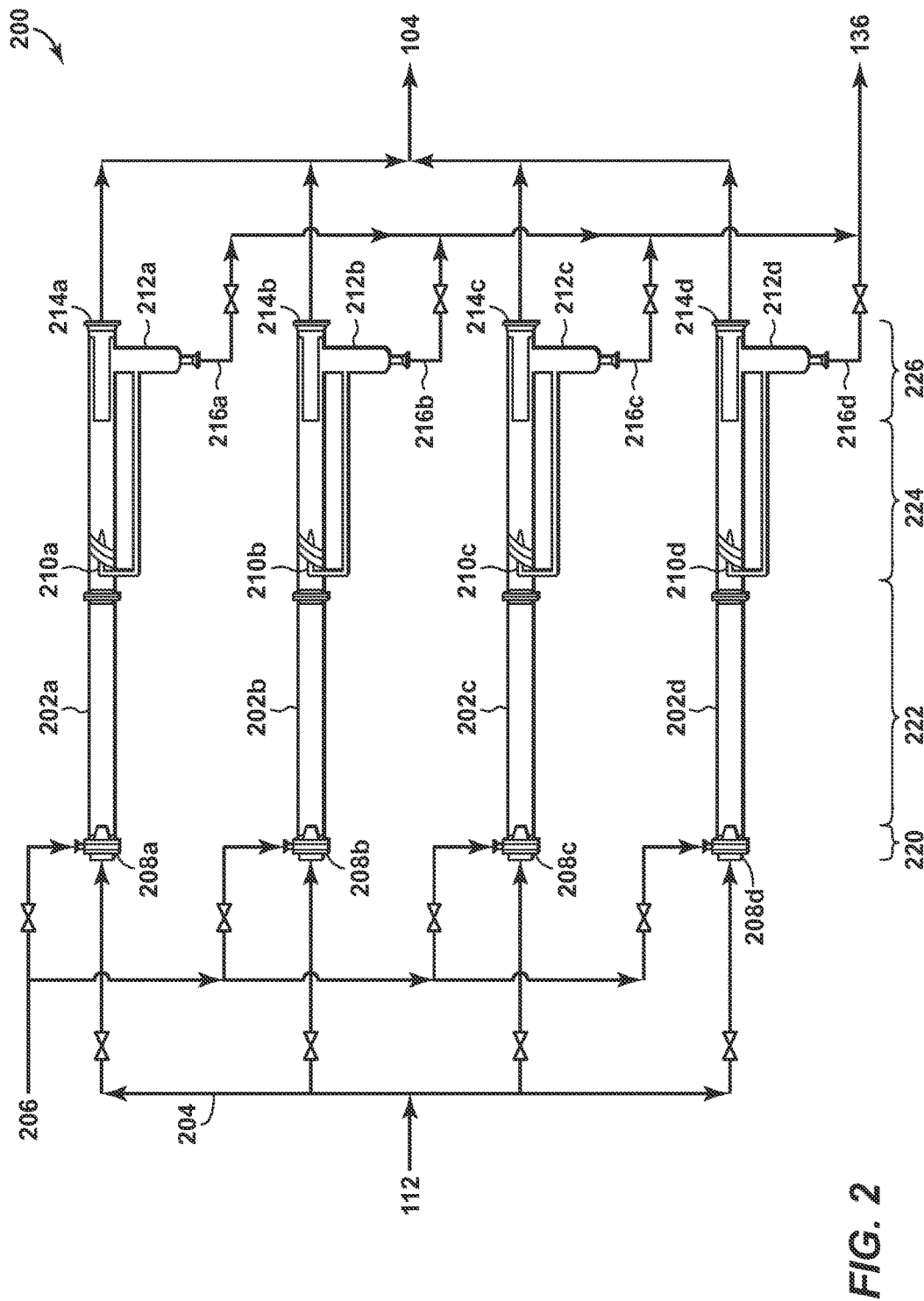
FIG. 2 is a schematic diagram of a multi-unit parallel process configuration for an in-line contacting system.

FIG. 2 is a schematic diagram of a multi-unit parallel process configuration for an in-line contacting system 200. The components of FIG. 2 are substantially the same as the corresponding components of FIG. 1 except as otherwise noted. The in-line contacting system 200 may replace a contactor 106 in FIG. 1. The in-line contacting system 200 has four contacting units 202a-202d separately supplied by a header 204 for a natural gas stream 112. The contacting units 202a-202d are separately supplied by a header carrying a lean solvent stream 206, e.g., a liquid glycol stream 118 of FIG. 1. Each contacting unit 202a-202d has an inlet nozzles 208a-208d for atomizing (dividing the liquid solvent into a large number of small droplets) and introducing the lean solvent stream 206. Atomizing the lean solvent stream 206 increases the surface area available for contact with the natural gas stream 112 and decreases the distances required for diffusion of acid gas components in both the vapor and liquid phases. Each contacting unit 202a-202d has a recycle gas inlet 210a-210d supplied by gas collected and returned from a seal pot or liquid boot 212a-212d. As depicted, each recycle gas inlet 210a-210d may include a swirl vane or equivalent structure to assist in separation. The seal pot or liquid boot 212a-212d may provide residence time for process control and may seal the contacting units 202a-202d to prevent gas bypass. Each contacting unit 202a-202d has a treated gas outlet 214a-214d and a rich solvent outlet 216a-216d. The treated gas outlets 214a-214d are depicted as comprising vortex tube finders, but alternate embodiments are well known in the art. Treated gas exiting the contacting units 202a-202d via the treated gas outlets 214a-214d may be combined and passed as the dehydrated and/or decontaminated natural gas stream 104, while rich solvent exiting the contacting units 202a-202d via the rich solvent outlets 216a-216d may be combined and passed as the spent desiccant stream 136.

In operation, each contacting unit 202a-202d receives a natural gas stream 112 at an inlet section 220, where the inlet nozzles 208a-208d atomize a lean solvent stream 206 and expose it to the natural gas stream 112. The mixed stream of atomized solvent and natural gas passes through a mass transfer section 222 where absorption occurs. The mass transfer section 222 may comprise a tubular body having a substantially empty bore. Alternatively, the mass transfer section 222 may comprise a variety of fixed elements. A separation section 224 follows the mass transfer section. In the separation section 224, entrained liquid droplets are removed from the gas stream, e.g., using a cyclone inducing element, resulting in an at least partially dehydrated and/or decontaminated treated gas stream. In some embodiments, the inlet section 220 and the mass transfer section 222 may collectively be referred to as a contacting section. The length of the contacting section may be determined based on the residence time required to obtain a predetermined decontamination and/or dehydration level for the natural gas stream 112, e.g., in view of the intended flow rate, pressure drop, etc. The treated gas stream exits the contacting units 202a-202d through the outlet section 226. The contacting units 202a-202d may operate at about 400 psia (about 28 bar) to about 1,200 psia, or higher. Because the contacting units 202a-202d must be individually constructed so as to tolerate these pressures, weight and/or footprint increases linearly as the number of contacting units 202a-202d is increased.

Figures 3A, 3B:
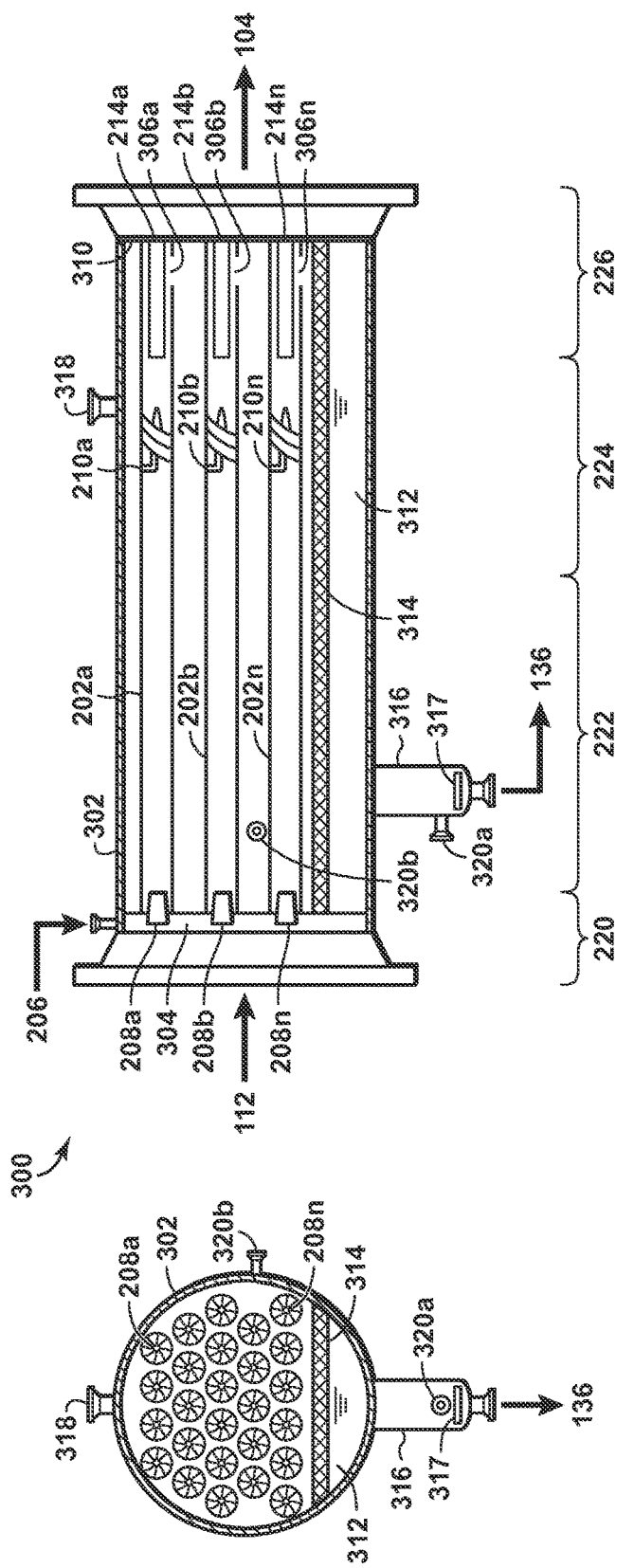
FIG. 3A is a side view of an embodiment of a single stage multiple co-current contactor configuration.
FIG. 3B is a cross-sectional end view of the single stage multiple co-current contactor configuration of FIG. 3A.

FIG. 3A is a side view of an embodiment of a single stage multiple co-current contactor configuration 300. The components of FIG. 3 are substantially the same as the corresponding components of FIG. 2 except as otherwise noted. The single stage multiple co-current contactor configuration 300 is generally contained within a vessel 302 which may form a unitary (single and/or common) pressure boundary for the compact contacting occurring therein. The vessel 302 may be configured to withstand in excess of (may have a pressure vessel rating of) about 500 psia (about 34 bar) of pressure, e.g., from about 600 psia (about 41 bar) to about 3,000 psia (about 207 bar), from about 800 psia (about 48 bar) to about 3,000 psia (about 207 bar), about 600 psia (about 41 bar) to about 2,000 psia (about 138 bar), from about 800 psia (about 48 bar) to about 2,000 psia (about 138 bar) from about 600 psia (about 41 bar) to about 1,000 psia (about 70 bar), from about 800 psia (about 48 bar) to about 1,000 psia (about 70 bar), from about 1,000 psia (about 70 bar) to about 3,000 psia (about 207 bar), from about 1,000 psia (about 70 bar) to about 2,000 psia (about 138 bar), from about 2,000 psia (about 138 bar) to about 3,000 psia (about 207 bar), or any range there between. The differential pressure across the length of the vessel 302, e.g., between the gas stream 112 and natural gas stream 104, may be about 200 psia (about 14 bar) to about 700 psia (about 48 bar), about 300 psia (about 21 bar) to about 600 psia (about 41 bar), about 400 psia (about 28 bar) to about 500 psia (about 34 bar), about 200 psia (about 14 bar) to about 600 psia (about 41 bar), about 300 psia (about 21 bar) to about 600 psia (about 41 bar), about 400 psia (about 28 bar) to about 600 psia (about 41 bar), about 500 psia (about 34 bar) to about 600 psia (about 41 bar), about 200 psia (about 14 bar) to about 500 psia (about 34 bar), about 300 psia (about 21 bar) to about 500 psia (about 34 bar), about 200 psia (about 14 bar) to about 400 psia (about 28 bar), about 300 psia (about 21 bar) to about 400 psia (about 28 bar), about 200 psia (about 14 bar) to about 300 psia (about 21 bar), or any range therebetween. The vessel 302 generally contains a single stage bundle of substantially parallel separation units or compact contactors comprising contacting units 202a-202n, also referred to herein as separation units. Those of skill in the art will understand that the number of contacting units 202a-202n in the bundle of compact contactors may be optionally selected based on the desired design characteristics, including desired flow rate, separation unit diameter, etc., and could number from anywhere between one to 300 or more units. The use of the letter nomenclature (i.e., 'a', 'b', 'n', etc.) in conjunction with the numerical reference characters is for ease of reference only and is not limiting. For example, those of skill in the art will understand that an illustrated set of contacting units 202a-202d may, in various embodiments, comprise two, four, five, twenty, or several hundred contacting units. The vessel 302 comprises an inlet tubesheet 304 having inlet nozzles 208a-208n in the inlet section 220. The inlet section 220 is configured to receive the natural gas stream 112 in a common inlet plenum through which the natural gas stream 112 may be distributed substantially equally across the contacting units 202a-202n. While a gas stream 112, gas stream 104, etc. are discussed herein, those of skill in the art will appreciate that generally the same principles may be applied to any fluid stream, including with respect to liquid-liquid contacting. Consequently, use of the phrases "gas stream," "gas inlet," "gas outlet," etc. are to be understood as non-limiting and may optionally be replaced with "fluid stream," "fluid inlet," "fluid outlet," and so forth in various embodiments within the scope of this disclosure. Use of the phrases "gas stream," "gas inlet," "gas outlet," etc. are for the sake of convenience only. The contacting units 202a-202n may be of a suitable size depending on the design requirements. For example, the contacting units 202a-202n may have an individual diameter from about 2 inches (in) (about 5 centimeters (cm)) to about 24 in (about 61 cm), about 3 in (about 7.6 cm) to about 20 in (about 50 cm), about 4 in (about 10.1 cm) to about 18 in (about 45 cm), about 6 in (about 15.3 cm) to about 12 in (about 30 cm), about 6 in (about 15.3 cm) to about 18 in (about 45 cm), about 12 in (about 30 cm) to about 18 in (about 45 cm), about 18 in (about 45 cm) to about 24 in (about 61 cm), or any range there between. The inlet tubesheet 304 is configured to receive the lean solvent stream 206 and pass the lean solvent stream 206 to the inlet nozzles 208a-208n, where the lean solvent stream 206 may be atomized. In some embodiments, the lean solvent stream 206 originates from a glycol supply system (not depicted) and the lean solvent stream 206 comprises glycol. The inlet nozzles 208a-208n may serve to entrain the atomized solvent stream in the natural gas stream 112, and the mixed stream of atomized solvent and natural gas may be passed to the mass transfer section 222 where absorption occurs. Each contacting unit 202a-202n has a recycle gas inlet 210a-210n supplied by recycle gas collected and returned, e.g., from a common boot 316. The boot 316 may be optionally included in low liquid rate applications to improve liquid rate flow control. As depicted, the boot 316 may have an internal vortex breaker 317 or other appropriate internals. For ease of viewing, the recycle gas supply lines for each of the recycle gas inlets 210a-210n are not depicted. As will be understood by those of skill in the art, the recycle gas inlets 210a-210n are optional, and recycle gas may additionally or alternatively be sent downstream in other embodiments. Rich solvent exiting the contacting units 202a-202n via the rich solvent outlets 306a-306n may drain into a common liquid degassing section or common contaminated liquid collection plenum 312. The plenum 312 may provide sufficient residence time for desired degasing, may reduce liquid surges coming with the natural gas stream 112, and may provide liquid seal to a cyclonic separation occurring in a contacting section of the separation device 202a-202n. The residence time provided by the plenum 312 can vary from 5 seconds to 5 minutes, depending on the operation of the process, or from 30 seconds to 1 minute in various embodiments. The vessel 302 contains a mist eliminator 314, e.g., a wire mesh, vane pack plates, baffles, or other internal devices to reduce liquid droplet carry over from degassing gas leaving the liquid phase of rich solvent in the plenum 312. The mist eliminator 314 may also serve as a momentum breaker for the rich solvent liquid exiting the separation device 202a-202n to minimize aeration of the liquid. In embodiments installed in offshore facilities or floating facilities or otherwise subject to motion, the mist eliminator 314 may mitigate wave motion effects in the bottom portion of the vessel 302. Each contacting unit 202a-202n has a treated gas outlet 214a-214n and a rich solvent outlet 306a-306n. The vessel 302 has a vent 318 for expelling degassing gas, e.g., gas degassed from rich solvent collected in the plenum 312 that may be fed upstream or downstream of the multiple co-current contacting unit, depending on the process configuration. The treated gas outlets 214a-214n couple to an outlet tubesheet 310. The treated gas exiting the contacting units 202a-202n via the treated gas outlets 214a-214n may be referred to as the dehydrated and/or decontaminated natural gas stream 104. The vessel 302 also contains level control ports 320a and 320b for coupling a level control system (not depicted) and controlling the amount of rich solvent 136 exiting the boot 316. Rich solvent 136 exiting the boot 316 may be sent to a regeneration system for treatment or combined with streams in other processes.

FIG. 3B is a cross-sectional end view of the single stage multiple co-current contactor configuration 300 of FIG. 3A taken at the inlet tubesheet 304. FIG. 3B shows an example arrangement of the contacting units 202a-202n in the vessel 302. Other acceptable arrangements will be readily apparent to those of skill in the art. FIG. 3B also shows a location of the mist eliminator 314, the plenum 312, the vent 318, the boot 316, the level control ports 320a and 320b, and the rich solvent stream 136.

FIG. 4A is a side view of an embodiment of a single stage multiple co-current contactor configuration 400. The components of FIG. 4 are substantially the same as the corresponding components of FIGS. 2-3B except as otherwise noted. The configuration 400 comprises contacting units 202a-202n in a vessel 302. FIG. 4A also shows the inlet tubesheet 304 having inlet nozzles 208a-208n in the inlet section 220. The inlet section 220 is configured to receive the natural gas stream 112. The configuration 400 also comprises a vent 318, a boot 316, and a dehydrated and/or decontaminated natural gas stream 104. The configuration 400 differs from the configuration 300 by not comprising a liquid settling section, common liquid degassing section, and/or common contaminated liquid collection plenum 312 or a mist eliminator 314 of FIG. 3. The embodiment of configuration 400 further differs from the configuration 300 by not comprising a level control port 320a or 320b or a vortex breaker 317 in the boot 316. The embodiment of configuration 400 may be useful when space is constrained or when the compact contactor shell reaches the maximum diameter for transportation and further compact contacting is required. Other uses will be apparent to those of skill in the art.

FIG. 4B is a cross-sectional end view of an embodiment of the single stage multiple co-current contactor configuration 400 of FIG. 4A taken at the inlet tubesheet 304. FIG. 4B shows an example arrangement of the contacting units 202a-202n in the vessel 302. Other acceptable arrangements will be readily apparent to those of skill in the art. FIG. 4B also shows a location of the vent 318, the boot 316, and rich solvent stream 136.

Figure 5:
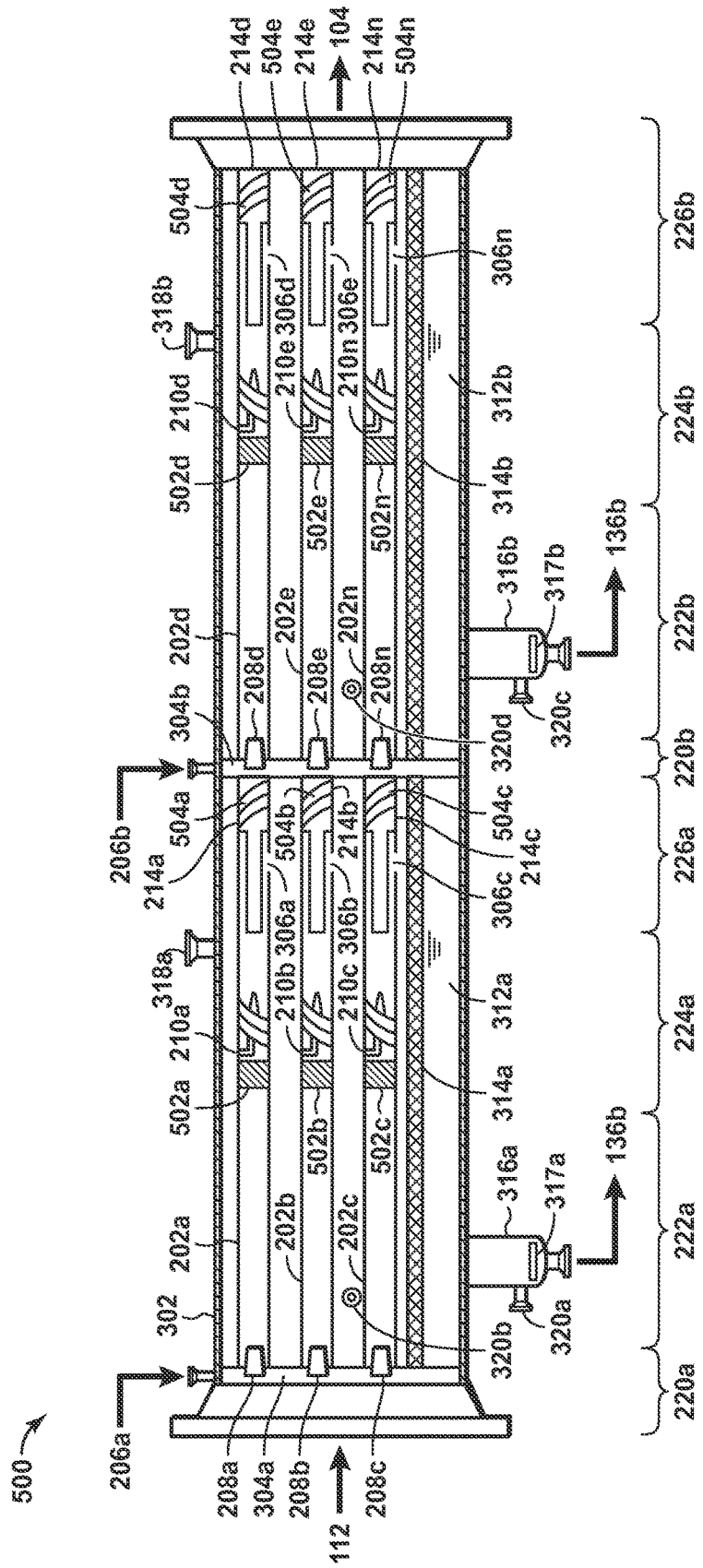
FIG. 5 is a side view of an embodiment of a two-stage multiple co-current contactor configuration.

FIG. 5 is a side view of an embodiment of a two-stage multiple co-current contactor configuration 500. While depicted with only two-stages, those of skill in the art will understand that the invention is not so limited and additional contacting stages may be optionally added, either in parallel or in series. The components of FIG. 5 are substantially the same as the corresponding components of FIGS. 2-4B except as otherwise noted. The configuration 500 generally comprises two single-stage multiple co-current contactor configurations 300 placed in-line and disposed within the same unitary vessel 302. The vessel 302 generally contains a first single stage bundle of compact contactors comprising contacting units 202a-202c, e.g., contacting units 202a-202n of FIG. 2, and a second single stage bundle of compact contactors comprising contacting units 202d-202n, e.g., contacting units 202a-202n of FIG. 2. In the first stage of compact contactors, the vessel 302 comprises a first inlet tubesheet 304a having inlet nozzles 208a-208c, e.g., inlet nozzles 208a-208n of FIG. 2, in the inlet section 220. The first inlet section 220a (corresponding to the inlet section 220 of FIGS. 3A and/or 4A) is configured to receive the natural gas stream 112 in a common inlet plenum through which the natural gas stream 112 may be distributed substantially equally across the contacting units 202a-202c. The inlet tubesheet 304a is configured to receive a solvent stream 206a and pass the solvent stream 206a, e.g., as an atomized stream, to the inlet nozzles 208a-208c. The inlet nozzles 208a-208c may entrain the atomized solvent stream 206a in the natural gas stream 112, and the mixed stream of atomized solvent and natural gas may be passed to the mass transfer section 222a (corresponding to the mass transfer section 222 of FIGS. 3A and/or 4A) where absorption occurs. Each contacting unit 202a-202c has a recycle gas inlet 210a-210c, e.g., 210a-210n of FIG. 2, disposed in a separation section 224a (corresponding to the separation section 224 of FIGS. 3A and/or 4A) and supplied by recycle gas supplied by recycle gas collected and returned, e.g., from a common liquid boot 316a (corresponding to the common liquid boot 316 of FIGS. 3A and/or 4A). The boot 316a may be optionally included in low liquid rate applications to improve liquid rate flow control. As depicted, the boot 316a may include an internal vortex breaker 317a. For ease of viewing, the recycle gas supply lines for each of the recycle gas inlets 210a-210c are not depicted. As will be understood by those of skill in the art, the recycle gas inlets 210a-210c are optional, and recycle gas may additionally or alternatively be sent downstream in other embodiments. Rich solvent exiting the contacting units 202a-202c via the rich solvent outlets 306a-306c, e.g., outlets 306a-306n of FIG. 3, may drain into a common liquid degassing section or common contaminated liquid collection plenum 312a having a mist eliminator 314a. Each contacting unit 202a-202c has a treated gas outlet 214a-214c, e.g., outlets 214a-214n of FIG. 2, disposed in an outlet section 226a (corresponding to the outlet section 226 of FIGS. 3A and/or 4A) for passing an at least partially dehydrated and/or decontaminated treated natural gas stream out of the first stage of compact contactors.

In the second stage of compact contactors, the vessel 302 comprises a second inlet tubesheet 304b coupled to the treated gas outlets 214a-214c and having inlet nozzles 208d-208n, e.g., inlet nozzles 208a-208n of FIG. 2, in the second inlet section 220. The second inlet section 220b (corresponding to inlet section 220 of FIGS. 3A and/or 4A) is configured to receive the at least partially dehydrated and/or decontaminated natural gas from the treated gas outlet 214a-214c in a common inlet plenum through which the at least partially dehydrated and/or decontaminated natural gas from the treated gas outlets 214a-214c may be distributed substantially equally across the contacting units 202d-202n. The common inlet plenum may be incorporated, e.g., as a void, within a plate and/or flange and may be sized based on the amount of mixing desired. Some embodiments may include flow directors, mixers, or other internals into the common inlet plenum. The second inlet tubesheet 304b is configured to receive a solvent stream 206b and pass the solvent stream 206b to the inlet nozzles 208d-208n. In some embodiments, the inlet nozzles 208d-208n are aligned with the treated gas outlets 214a-214c, while in other embodiments the inlet nozzles 208d-208n and the treated gas outlets 214a-214c are offset. The inlet nozzles 208d-208n may atomize and entrain the solvent stream 206b in the at least partially dehydrated and/or decontaminated natural gas stream from the treated gas outlets 214a-214c, and the mixed stream of atomized lean solvent and at least partially dehydrated and/or decontaminated natural gas may be passed to the mass transfer section 222b (corresponding to the mass transfer section 222 of FIGS. 3A and/or 4A) where absorption occurs. Each contacting unit 202d-202n has a recycle gas inlet 210d-210n, e.g., 210a-210n of FIG. 2, disposed in a separation section 224b (corresponding to the separation section 224 of FIGS. 3A and/or 4A) and supplied by recycle gas supplied by recycle gas collected and returned, e.g., from a common liquid boot 316b (corresponding to the common liquid boot 316 of FIGS. 3A and/or 4A). The boot 316b may be optionally included in low liquid rate applications to improve liquid rate flow control. As depicted, the boot 316b may have an internal vortex breaker 317b. For ease of viewing, the recycle gas supply lines for each of the recycle gas inlets 210d-210n are not depicted. As will be understood by those of skill in the art, the recycle gas inlets 210d-210n are optional, and recycle gas may additionally or alternatively be sent downstream in other embodiments. Solvent exiting the contacting units 202d-202n via the solvent outlets 306d-306n, e.g., outlets 306a-306n of FIG. 3, may drain into a common liquid degassing section or common contaminated liquid collection plenum 312b having a mist eliminator 314b. Each contacting unit 202d-202n has a treated gas outlet 214d-214n, e.g., outlets 214a-214n of FIG. 2, disposed in an outlet section 226b (corresponding to the outlet section 226 of FIGS. 3A and/or 4A) for passing a treated gas stream out of the second stage of compact contactors. Treated gas exiting the contacting units 202a-202n via the treated gas outlets 214a-214n may be combined and passed through the dehydrated and/or decontaminated natural gas stream 104.

The vessel 302 has a first stage vent 318a and a second stage vent 318b for expelling degassing gas from the first and second stages of compact contactors, respectively. The vessel 302 also contains level control ports 320a-320d for coupling a level control system (not depicted) and controlling the amount of rich solvent exiting the boots 316a and/or 316b. Additionally, the contacting units 202a-202n are depicted with coalescing elements 502a-502n in the contacting sections, e.g., vane elements, packing, mesh, etc., for coalescing the small droplets into larger sizes. This may improve separation between the gas and solvent. The coalescing elements may only be desirable in clean services. The contacting units 202a-202n also comprise anti-swirl elements 504a-504n in the outlet sections 226a and 226b.

It will be understood that the two-stage multiple co-current contactor configuration 500 may function as a counter-current contactor with co-current stages. As it passes through the two-stage multiple co-current contactor configuration 500, the natural gas stream 112 may be increasingly dehydrated and/or decontaminated as it experiences a longer and longer residence time with respect to a solvent. Additionally, the second stage of compact contactors may receive the leanest solvent, e.g., the lean solvent stream 206b, for finely dehydrating and/or decontaminating the least hydrated and/or contaminated gas stream exiting earlier stages. Further, the first stage may receive a semi-lean solvent stream 206a, e.g., the semi-lean solvent stream 136b from the second stage of compact contactors, for removing the bulk of the water and/or contamination from the untreated gas stream 112. Other contacting configurations will be apparent to those of skill in the art. In all cases, solvent leaving the liquid boot 316a or 316b will be richer, i.e., containing a higher concentration of contaminant, than the liquid inlet 206a or 206b, respectively for each stage. While depicted with only two-stages, those of skill in the art will understand that the invention is not so limited and additional contacting stages may be optionally added, either in parallel or in series.

Figure 6:
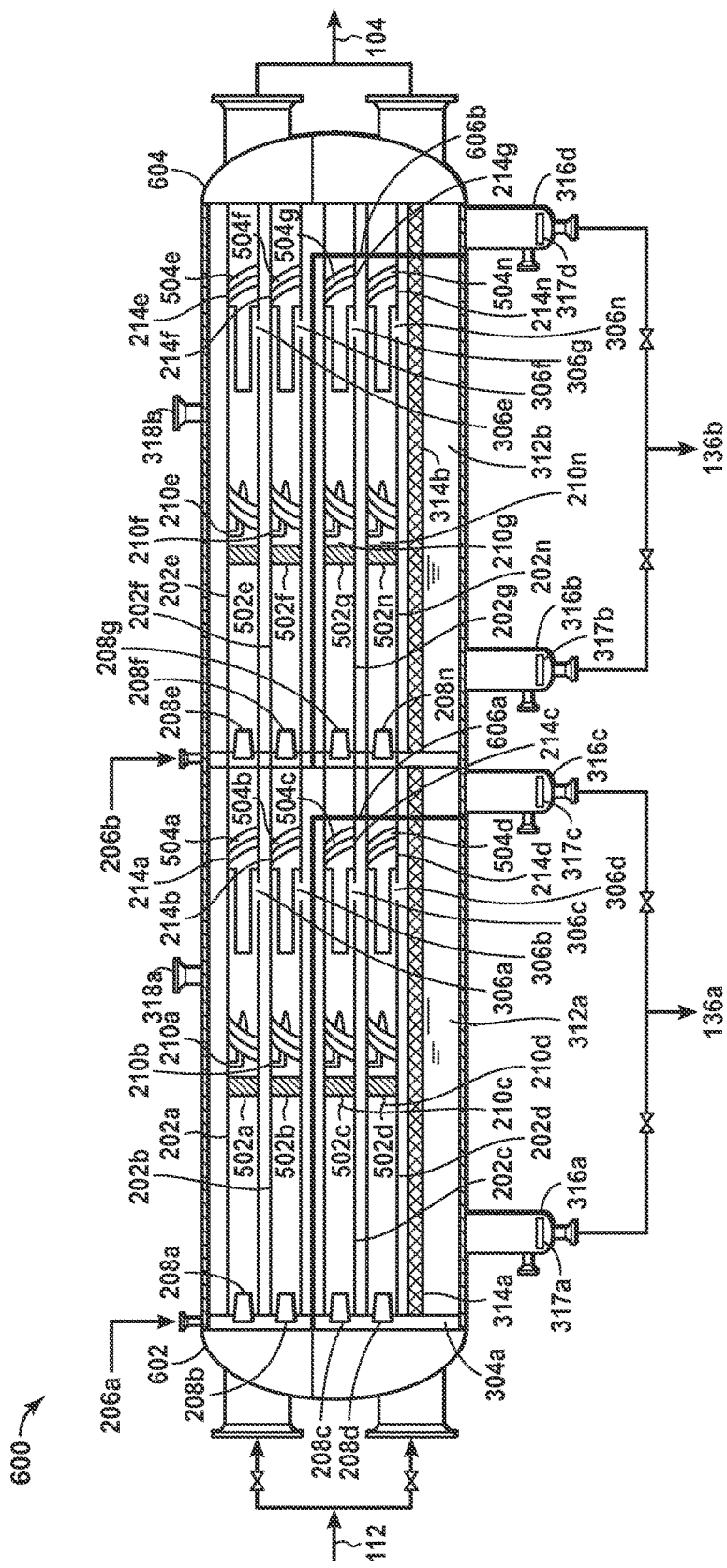
FIG. 6 is a side view of an embodiment of a two-stage multiple co-current contactor configuration comprising baffling to allow for turndown within a single vessel.

FIG. 6 is a side view of an embodiment of a two-stage multiple co-current contactor configuration 600 comprising baffling to allow for turndown within a single vessel. While depicted with only two-stages, those of skill in the art will understand that the invention is not so limited and additional contacting stages may be optionally added, either in parallel or in series. The components of FIG. 6 are substantially the same as the corresponding components of FIGS. 2-5 except as otherwise noted. The configuration 600 generally comprises two single stage multiple co-current contactor configurations 300 placed in-line and disposed within the same unitary vessel 302. The configuration 600 comprises a bifurcated inlet 602 for receiving an untreated gas stream 112 and a bifurcated outlet 604 for passing a dehydrated and/or decontaminated natural gas stream 104. The bifurcated inlet 602 has two common inlet plenums through which the natural gas stream 112 may be distributed substantially equally across a respective portion of contacting units 202a-202n. A baffle 606a in the first stage of the configuration 600 divides a first portion of contacting units 202a-202d from a second portion of contacting units contacting units 202a-202d. A baffle 606b in the second stage of the configuration 600 divides a first portion of contacting units 202e-202n from a second portion of contacting units 202e-202n. As depicted, the treated gas output from the first portion of contacting units 202a-202d may be received as input gas by the first portion of contacting units 202e-202n, and the treated gas output from the second portion of contacting units contacting units 202a-202d may be received as input gas by the second portion of contacting units 202e-202n. The configuration 600 comprises a common liquid boot 316c and a common liquid boot 316d associated with the second portion of contacting units 202a-202d and 202e-202n, respectively.

In operation, the first or second portion of contacting units 202a-202d and/or 202e-202n may be optionally isolated to allow for turndown within a single vessel. Although the depicted embodiment utilizes baffling, those of skill in the art will recognize that turndown can alternately or additionally be obtained in a number of different ways. For example, blanking plates may be installed over the inlet of a portion of contacting units 202a-202n depending on the desired flow rate. In some situations this may be undesirable because a shutdown may be required in order to add and/or remove blanking plate. Another technique includes integrating a knife valve near the tubesheet with the prescribed blanking area so as to only allow vapor to enter a predetermined number of compact contacting elements. Still another technique includes utilizing a parallel series of smaller vessels configured to allow split flow design to a selected number of vessels. In some situations this may be undesirable because it may add cost and/or footprint to a facility. These and other techniques will be apparent to those of skill in the art.

FIG. 7A is a cross section view of a vertical embodiment of a two-stage multiple co-current contactor configuration 700, e.g., the two-stage multiple co-current contactor configuration 500 of FIG. 5. FIG. 7B is a side view of the vertical embodiment of the two-stage multiple co-current contactor configuration 700 of FIG. 7A. FIG. 7C is an end view of the vertical embodiment of the two-stage multiple co-current contactor configuration 700 of FIG. 7A. While configurations 300, 400, 500, and 600 have been depicted substantially horizontally disposed, and are suitably used in a substantially horizontal disposition, it will be appreciated that each such embodiment may be modified to utilize a substantially vertical disposition within the present disclosure. The components of configuration 700 are substantially the same as the corresponding components of FIGS. 2-5 except as otherwise noted. The configuration 700 comprises an inlet section 702, a first contacting stage 704, a second contacting stage 706, and an outlet section 708. The inlet section 702 is configured to receive a natural gas stream 112. The inlet section 702 may include internals to allow the removal of entrained liquids entering the system through natural gas stream 112, e.g. demisting pad, demisting cyclones, etc. The first contacting stage 704 and second contacting stage 706 may comprise generally the same components as the first and second stages in the two-stage multiple co-current contactor configuration 500 of FIG. 5. The boot 316a and 316b may be disposed on a lower end of first contacting stage 704 and second contacting stage 706, respectively. This may permit gravity to assist in passing rich and/or semi-rich solvent through the boots 316a and/or 316b.

FIG. 8 is a side-by-side comparison of a historic glycol tower 802 having an inlet dehydration scrubber 804 in comparison with an embodiment of a two-stage multiple co-current contactor 806, e.g., the two-stage multiple co-current contactor configuration 700 of FIGS. 7A-7C. In one embodiment, the glycol tower 802 may be about 8.5 feet (ft) wide and about 45 feet tall, the inlet dehydration scrubber 804 may be about 11 feet wide and about 18 feet tall, and the two-stage multiple co-current contactor 806 may be about 4 feet wide and about 25 feet tall. Those of skill in the art will appreciate the compactness and process intensification that may be achieved using the two-stage multiple co-current contactor 806, e.g., appreciable savings in weight, cost, footprint, and size.

While the present techniques may be susceptible to various modifications and alternative forms, the exemplary embodiments discussed herein have been shown only by way of example. However, it should again be understood that the techniques disclosed herein are not intended to be limited to the particular embodiments disclosed. Indeed, the present techniques include all alternatives, modifications, combinations, permutations, and equivalents falling within the true spirit and scope of the appended claims.

What is claimed is:

1. An apparatus for decontaminating a contaminated fluid stream, comprising:
   a vessel comprising:
   a contaminated fluid stream inlet;
   a decontaminated fluid stream outlet;
   a solvent inlet;
   a contaminated solvent stream outlet; and
   a co-current contacting bundle disposed within the vessel, wherein the co-current contacting bundle comprises at least two substantially parallel separation units, and wherein each separation unit comprises:
   a contacting section including an inlet section and a mass transfer section, the mass transfer section comprising a tubular body having a first end into which a contaminated fluid stream is directed, the inlet section including a nozzle situated at the first end of the tubular body and oriented to direct an atomized solvent stream, generated by the nozzle, into the tubular body such that the atomized solvent stream flows in the same direction as a direction of flow of the contaminated fluid stream, thereby forming a mixed stream, the tubular body arranged to permit absorption of contaminants in the contaminated fluid stream by the atomized solvent stream to generate a contaminated solvent stream and an at least partially decontaminated fluid stream; and a separation section arranged to receive the contaminated solvent stream and the at least partially decontaminated fluid stream from the mass transfer section, the separation section configured to separate the contaminated solvent stream from the at least partially decontaminated fluid stream.

2. The apparatus of claim 1, wherein at least one separation section comprises a vortex tube finder in gaseous communication with the fluid stream outlet.

3. The apparatus of claim 1, wherein a plurality of the separation sections each comprise a contaminated solvent outlet orifice, wherein the vessel comprises a common contaminated solvent collection plenum in fluid communication with the contaminated solvent outlet orifices, and wherein the common contaminated solvent collection plenum is in fluid communication with the contaminated solvent stream outlet.

4. The apparatus of claim 3, wherein the vessel further comprises a demisting section disposed within the common contaminated solvent collection plenum.

5. The apparatus of claim 1, further comprising:

a second co-current contacting bundle disposed within the vessel, wherein the second co-current contacting bundle comprises at least two secondary separation units, wherein the second co-current contacting bundle is in-line with the first co-current contacting bundle, and wherein each secondary separation unit comprises:

a second contacting section including a second inlet section and a second mass transfer section downstream of the second inlet section; and a second separation section downstream of the second mass transfer section.

6. The apparatus of claim 1, wherein at least one separation unit comprises a coalescing element disposed in the tubular body upstream of the separation section, the coalescing element configured to coalesce droplets of the contaminated solvent stream.

7. The apparatus of claim 1, wherein each separation unit is between about 2 inches (about 5 centimeters) and about 24 inches (about 61 centimeters) in diameter.

8. The apparatus of claim 1, further comprising an anti-swirl element disposed in the tubular body downstream of the separation section, the anti-swirl element configured to reduce swirl of the at least partially contaminated fluid stream.

9. The apparatus of claim 1, further comprising a vortex breaker in the solvent stream outlet.

10. The apparatus of claim 1, wherein at least one of the separation units includes an outlet section through which the contaminated solvent stream and the at least partially decontaminated fluid stream exit the separation unit separately, the outlet section having a liquid boot that collects the contaminated solvent stream, the separation unit further comprising:

a recycle gas inlet disposed in the separation section and connected to a portion of the liquid boot where gas remaining in the contaminated solvent stream is separated therefrom, the recycle gas inlet configured to direct gas in the liquid boot back to the separation section.

* * * * *